(12) United States Patent
Wolfgarten et al.

(10) Patent No.: US 9,505,381 B2
(45) Date of Patent: Nov. 29, 2016

(54) WIPER DEVICE WITH AT LEAST ONE WIPER ARM AND WITH AT LEAST ONE NOZZLE ELEMENT

(71) Applicant: Robert Bosch GmbH, Stuttgart (DE)

(72) Inventors: Sven Wolfgarten, Buehl (DE); Harald Rapp, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/360,193

(22) PCT Filed: Sep. 24, 2012

(86) PCT No.: PCT/EP2012/068719
§ 371 (c)(1),
(2) Date: May 22, 2014

(87) PCT Pub. No.: WO2013/075860
PCT Pub. Date: May 30, 2013

(65) Prior Publication Data
US 2014/0325784 A1    Nov. 6, 2014

(30) Foreign Application Priority Data

Nov. 22, 2011    (DE) ................ 10 2011 086 780

(51) Int. Cl.
*B60S 1/52* (2006.01)
*B60S 1/32* (2006.01)
*B60S 1/34* (2006.01)
(Continued)

(52) U.S. Cl.
CPC ............. *B60S 1/522* (2013.01); *B60S 1/32* (2013.01); *B60S 1/3415* (2013.01); *B60S 1/3497* (2013.01); *B60S 1/3862* (2013.01); *B60S 1/3848* (2013.01); *B60S 1/4048* (2013.01)

(58) Field of Classification Search
CPC .... B60S 1/3849; B60S 1/4038; B60S 1/522; B60S 1/524; B60S 1/52; B60S 1/32; B60S 1/3497; B60S 1/3415; B60S 1/3861
USPC ............ 15/250.01, 250.04, 250.351, 250.32; 239/284.1, 284.2
See application file for complete search history.

(56) References Cited

U.S. PATENT DOCUMENTS 1,572,618 A * 2/1926 Nolan .................... F04B 47/00
                                                           417/453
2,814,820 A * 12/1957 Elliott et al. ............. 15/250.201
3,037,233 A * 6/1962 Peras et al. ............... 15/250.201
(Continued)

FOREIGN PATENT DOCUMENTS

CN        2837158 Y      11/2006
CN     101213121 A       7/2008
(Continued)

OTHER PUBLICATIONS

International Search Report for Application No. PCT/EP2012/068719 dated Jan. 7, 2013 (2 pages).

*Primary Examiner* — Gary Graham
(74) *Attorney, Agent, or Firm* — Michael Best & Friedrich LLP

(57) ABSTRACT

The invention is based on a wiper device with at least one wiper arm (10*a*; 10*b*; 10*c*) and with at least one nozzle element (12*a*; 12*b*, 14*b*; 12*c*) which is provided for spraying wiping water. It is proposed that the at least one nozzle element (12*a*; 12*b*, 14*b*; 12*c*) is directly connected in a low position to the wiper arm (10*a*; 10*b*; 10*c*).

16 Claims, 2 Drawing Sheets

(51) Int. Cl.
  *B60S 1/38* (2006.01)
  *B60S 1/40* (2006.01)

(56) References Cited

U.S. PATENT DOCUMENTS

| | | | | |
|---|---|---|---|---|
| 3,432,876 | A | * | 3/1969 | Edwards .................... 15/250.04 |
| 3,440,678 | A | * | 4/1969 | Tibbet ........................ 15/250.04 |
| 3,790,083 | A | * | 2/1974 | Redifer ..................... B05B 1/10 |
| | | | | 15/250.04 |
| 3,827,101 | A | * | 8/1974 | Wubbe ....................... 15/250.04 |
| 3,940,068 | A | * | 2/1976 | Mohnach et al. ......... 239/284.1 |
| 4,337,547 | A | * | 7/1982 | Hancou ................. B60S 1/3801 |
| | | | | 15/250.32 |
| 4,516,288 | A | * | 5/1985 | Fizyta et al. ............... 15/250.04 |
| 5,016,312 | A | * | 5/1991 | Frimley ..................... 15/250.04 |
| 5,239,726 | A | * | 8/1993 | Bianco ....................... 15/250.4 |
| 5,392,487 | A | * | 2/1995 | Yang ..................... B60S 1/4003 |
| | | | | 15/250.32 |
| 5,842,251 | A | * | 12/1998 | LeFrançois et al. ....... 15/250.04 |
| 5,903,953 | A | | 5/1999 | Dimur et al. |
| 6,513,185 | B1 | * | 2/2003 | Zimmer et al. ............ 15/250.04 |
| 6,934,992 | B2 | * | 8/2005 | Sato ........................... 15/250.04 |
| 2002/0116779 | A1 | * | 8/2002 | Vogt ........................... 15/250.04 |
| 2011/0107541 | A1 | * | 5/2011 | Caillot et al. .............. 15/250.04 |

FOREIGN PATENT DOCUMENTS

| | | | |
|---|---|---|---|
| CN | 201099221 | Y | 8/2008 |
| DE | 2044728 | A1 | 3/1972 |
| DE | 3323004 | A1 | 1/1985 |
| DE | 19815171 | | 6/1999 |
| DE | 102004007351 | | 9/2005 |
| EP | 0566470 | B1 * | 6/1996 |
| EP | 0974503 | | 1/2000 |
| EP | 1985513 | | 10/2008 |
| FR | 1251393 | * | 12/1960 |
| GB | 668923 | A | 3/1952 |
| GB | 798526 | A | 7/1958 |
| GB | 1755762 | * | 11/1971 |
| GB | 2047079 | A * | 11/1980 |
| GB | 2326083 | A | 12/1998 |
| WO | WO02/08034 | A1 * | 1/2002 |

* cited by examiner

WIPER DEVICE WITH AT LEAST ONE WIPER ARM AND WITH AT LEAST ONE NOZZLE ELEMENT

BACKGROUND OF THE INVENTION

A wiper device has already been proposed with at least one wiper arm, at least one wiper blade, which can be fastened to the wiper arm and comprises at least one wiper lip, and at least one nozzle element which is provided for spraying wiper fluid.

SUMMARY OF THE INVENTION

The invention is based on a wiper device with at least one wiper arm and with at least one nozzle element which is provided for spraying wiper fluid.

It is proposed that the at least one nozzle element is directly connected in a low position to the wiper arm. As a result, a wiper device can be provided which can be especially easily applied to different motor vehicles. A "wiper arm" thereby refers particularly to an elongated element of the wiper device, which element is connected on the one end thereof to a wiper motor and transmits a wiping motion from the wiper motor to a wiper blade that is mounted at the end which is opposite the end connected to the wiper motor. A nozzle element refers in this context particularly to an element which is provided to spray a fluid, in particular wiper fluid for cleaning a window pane of a vehicle, in a certain spraying direction. In so doing, the nozzle element preferably has a connecting element for attaching a wiper fluid tube. A "low position" refers particularly to a position of the nozzle element in relation to the wiper blade, wherein the nozzle element, in operational position, protrudes in the direction of a vehicle window pane beyond a lower edge of the wiper arm which faces the vehicle window pane. The phrase "directly connected to the wiper arm" refers particularly to the fact that the nozzle element and/or a retaining means which can be associated with said nozzle element or with the wiper arm is connected directly to the wiper arm, i.e. the nozzle element and the wiper arm are directly in contact at a contact point or via the retaining means and in particular are fixedly connected to one another via said contact point. Hence, the phrase "directly connected to the wiper arm" is particularly not intended to mean that the nozzle element is connected to the wiper arm via a further functional component which goes beyond a strict retaining function, such as, for example, a wiper blade guide unit.

It is further proposed that the at least one nozzle element projects at least 5 mm below a lower edge of the wiper arm. As a result, the nozzle element is situated in a particularly advantageous position in order to spray the wiper fluid particularly advantageously. The nozzle element advantageously protrudes at least 5 mm below the lower edge of the wiper arm, wherein the nozzle element very advantageously protrudes at least 10 mm and in a particularly advantageous embodiment at least 15 mm below the lower edge of the wiper arm. The phrase "protrudes X mm below a lower edge of the wiper arm" refers particularly to the fact that a side of the nozzle element that faces away from the lower edge of the wiper arm protrudes by X mm in the direction of the vehicle window pane beyond the wiper arm; i.e., in a fitted state, is X mm closer to the vehicle window pane than the lower edge of the wiper arm.

It is further proposed that the at least one nozzle element is embodied as a separate component. In so doing, the individual components such as nozzle element and wiper arm can be of a particularly simple design. By the term "separate component", it is to be understood that the component is produced in a separate procedure and/or, prior to mounting, is embodied separately from the wiper arm and without a component that is also common to the wiper arm or a wiper blade guide.

It is further proposed that the at least one nozzle element is provided to spray a wiper fluid at least substantially in the direction of a wiper lip. As a result, the wiper fluid can be particularly advantageously applied for wiping the vehicle window pane without impairing the vision of the driver. A "wiper lip" refers here particularly to a part of the wiper blade which, in the operational position, lies against the vehicle window pane and is provided to wipe said window pane. A "wiper blade" refers particularly to an assembly which is composed of a plurality of elements, such as a wiper lip, a spoiler element, a spring rail and end caps, and is provided to fully rest against a motor vehicle window pane to be wiped with the wiper lip thereof. The phrase "spray at least substantially in the direction of the wiper lip" refers particularly to the fact that a wiper fluid stream which escapes from the nozzle element is sprayed from a plane which is parallel to the main extension direction of the wiper arm, is perpendicular to the vehicle window pane and runs through the nozzle element in a spraying direction oriented in the direction of the wiper blade.

In addition, it is proposed that the at least one nozzle element has at least one spray channel, the end of which is oriented at least substantially in the direction of the wiper lip. The wiper fluid can thereby be particularly easily sprayed in the direction of the wiper lip. A "spray channel" refers here particularly to a channel through which the wiper fluid can be carried to from the interior of the nozzle element to the outside. The term "end of the spray channel" is to be understood as an opening in the nozzle element which is connected via the spray channel to the interior of the nozzle element; and thus wiper fluid can escape from the interior of the nozzle element to the outside via the spray channel and the opening thereof and can then, for example, be sprayed on a vehicle window pane. In so doing, the spray channel can have a special shape, in particular a special inside contour, such as, for example, a conical shape, through which a wiper fluid carried through the spray channel can be accelerated and concentrated. In principle, other inside contours, which appear useful to the person skilled in the art, are also conceivable.

It is further proposed that the nozzle element has at least one additional spray channel, the end of which is oriented in a different direction than the end of the first spray channel. As a result, the wiper fluid can be particularly advantageously distributed across the length of the wiper lip. By the term "a different direction", it is particularly to be understood that the additional spray channel together with the main extension direction of the wiper blade enclose a different angle than the first spray channel.

It is furthermore proposed that the at least one nozzle element is disposed between an inner circle of the wiper blade and a connection adaptor unit, in closer proximity to the connection adaptor unit. As a result, the nozzle element can be particularly advantageously placed for an especially efficient distribution of the wiper fluid. The term "inner circle" refers particularly to a free, inner wiper blade end. By a "free inner wiper blade end", an end of a component, in particular of the wiper blade, is to be particularly understood in this context, said end of a component pointing to a center of rotation of the wiper device, about which said wiper device rotates in an operating state. The phrase "in closer proximity to the connection adaptor unit" refers in this case particularly to the fact that a distance between the nozzle element and the connection adaptor unit is substantially less than a distance between the nozzle element and the inner circle. By the term "substantially less", it is particularly to be understood in this context that the distance between the nozzle element and the connection adaptor unit is at the most ⅓ of the distance between the nozzle element and the inner circle.

In addition, it is proposed that the wiper device has a second nozzle element, wherein the second nozzle element is disposed closer to the inner circle of the wiper blade. As a result, the wiper fluid can be distributed especially well and completely on the entire wiper lip. The phrase "in closer proximity to the inner circle of the wiper blade" refers thereby particularly to the fact that the distance between the second nozzle element and the inner circle is substantially less than the distance between the second nozzle element and the connection adaptor unit. By "substantially less", it is particularly to be understood in this context that the distance between the second nozzle element and the inner circle is at most ⅕ of the distance between the second nozzle element and the connection adaptor unit.

It is further proposed that the wiper arm has a wiper arm adaptor, on which the one nozzle element is disposed. In so doing, the entire wiper lip can very easily be wetted with wiper fluid by the one nozzle element. A "wiper arm adaptor" refers in this context particularly to an adaptor which has a region that contacts the wiper arm and is undetachably connected to said wiper arm and is provided to supply a coupling region of the wiper arm for a coupling and/or contacting to a wiper blade adaptor. A "wiper blade adaptor" refers in this context particularly to an adaptor which has a region that contacts the wiper blade and is undetachably connected to the wiper blade and is provided to supply a coupling region for a coupling and/or contacting to the wiper arm adaptor. By "disposed on the wiper arm adaptor", it is particularly understood that the nozzle element is disposed directly at the wiper arm adaptor and is either directly and fixedly connected to said wiper arm adaptor or is directly fastened to a point on the wiper arm whereat the same is connected to the wiper arm adaptor or, respectively, merges into said wiper arm adaptor. In so doing, the nozzle element is advantageously spaced apart from the wiper arm adaptor at a distance which is less than 5 mm, advantageously less than 3 mm and in a particularly advantageous embodiment less than 1 mm. The nozzle element is advantageously disposed so close to the wiper arm adaptor that if at all possible said nozzle element cannot be recognized by the driver as a component which is separate from the wiper arm adaptor.

It is furthermore proposed that the nozzle element has at least two spray channels, wherein an end of the one spray channel is oriented in the direction of an inner circle and an end of the other spray channel is oriented in the direction of an outer circle. As a result, the wiper lip can be very easily completely wetted with wiper fluid by the exclusively one nozzle element. By the phrase "oriented in the direction of the inner circle", it is thereby particularly understood that the wiper fluid which is sprayed from the corresponding spray channel is sprayed in the direction of the inner circle. By the phrase "oriented in the direction of the outer circle", it is thereby particularly understood that the wiper fluid which is sprayed from the corresponding spray channel is sprayed in the direction of the outer circle.

In addition, it is proposed that the wiper blade does not include an inner circle guidance unit. In so doing, the wiper device can be particularly simply configured. The term "inner circle guidance unit" refers in this context particularly to a unit which, in an operating state, is provided to guide a free, inner wiper blade end of the wiper blade along an inner circle path of the inner circle guidance unit.

BRIEF DESCRIPTION OF THE DRAWINGS

Further advantages ensue from the following description of the drawings. In the drawings, three exemplary embodiments of the invention are depicted. The drawings, the description and the claims contain numerous features in combination. The person skilled in the art will expediently consider the features individually and put them together to from further useful combinations.

In the drawings.

DETAILED DESCRIPTION

Figure 1:
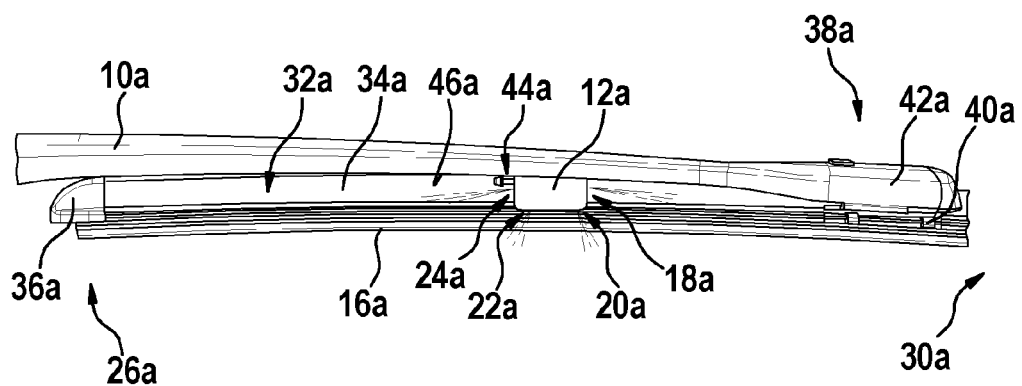
FIG. 1 shows an inventive wiper device comprising a nozzle element in a first exemplary embodiment.

FIG. 1 shows a wiper device according to the invention in a first exemplary embodiment. The wiper device comprises a wiper arm 10*a*, which can be driven in a pivoting motion by means of a wiper motor, which is not depicted in detail. The wiper arm 10*a* is only basically depicted and is not intended to represent a limitation on the embodiment thereof. The wiper device comprises a wiper blade 32*a* which, in a fitted state, is provided to wipe a vehicle window pane. The wiper blade 32*a* is constructed from a plurality of components. The wiper blade 32*a* comprises a wiper lip 16*a*, which, in the fitted state, rests against the vehicle window pane and a spring rail, which is not depicted in detail, is fixedly connected to the wiper lip 16*a* and presses the same across the entire length thereof against the vehicle window pane, a wiping force being thereby transmitted to the wiper lip 16*a*. The wiper blade 32*a* furthermore comprises at least two spoiler elements 34*a* which are disposed on a side of the wiper blade 32*a* which, in the fitted state, faces away from the vehicle window pane. The spoiler elements 34*a* have an aerodynamic shape and are provided to press the wiper blade 32*a* against the vehicle window pane while the vehicle is moving and thereby prevent the wiper lip 16*a* from lifting off the vehicle window pane. In addition, the wiper blade 32*a* comprises two end caps 36*a*, which delimit and close off the wiper blade 32*a* respectively on one side in the direction of the main extension thereof. In principle, it is, of course, also conceivable that the wiper blade 32*a* has further components or consists of fewer components. The wiper blade 32*a* thereby does not include any inner circle guidance unit which fixes the wiper blade 32*a* to the inner circle thereof 26*a* beneath the wiper arm 10*a*. In principle, it is however also conceivable that the wiper blade 32*a* is fixed beneath the wiper arm 10*a* via an inner circle guidance unit.

In order to connect the wiper blade 32*a* to the wiper arm 10*a*, the wiper device has a connection adaptor unit 38*a*. The connection adaptor unit 38*a* comprises a wiper blade adaptor 40*a* and a wiper arm adaptor 42*a*. The wiper blade adaptor 40*a* is fixedly connected to the wiper blade 32*a*. It is thereby conceivable that the wiper blade adaptor 40*a* is connected to the wiper blade 32*a* in a fixed and non-destructively inseparable manner. In principle, the wiper blade adaptor 40*a* can be connected to the wiper blade 32a in a mechanically separable manner, for example by means of a latching connection. The wiper arm adaptor 42a is fixedly connected to the wiper arm 10a. In so doing, it is also true that the wiper arm adaptor 42a is connected to the wiper arm 10a in a fixed and inseparable manner or in a fixed and releasable manner. The wiper arm adaptor 42a can be fixedly connected to the wiper blade adaptor 40a but in a mechanically and non-destructively separable manner. As a result, the wiper blade 32a can be fixedly connected to the wiper arm 10a by means of the wiper blade adaptor 40a and the wiper arm adaptor 42a.

The wiper device further comprises a nozzle element 12a, which is provided to spray a wiper fluid. To this end, the nozzle element 12a has at least one hose connection 44a, to which, in an operating state, a wiper fluid hose, which is not depicted in detail, can be attached. By means of the hose connection 44a, a wiper fluid can travel via the attached wiper fluid hose into an interior of the nozzle element 12a. The wiper fluid hose is thereby guided along the wiper arm 10a. In so doing, the wiper fluid hose can in principle be guided on the side of or beneath the wiper arm 10a. In principle, it is also conceivable that the wiper fluid hose is directly integrated into the wiper arm 10a. In so doing, an end of the wiper fluid hose facing away from the nozzle element 12a is connected to a pumping unit, which is not depicted in detail and by means of which wiper fluid can be pumped out of a wiper fluid tank, which is not depicted in detail, through the wiper fluid hose to the nozzle element 12a.

The nozzle element 12a is disposed between the inner circle 26a of the wiper blade 32a and the connection adaptor unit 38a. As a result, the nozzle element is disposed in closer proximity to the connection adaptor unit 38a. The nozzle element 12a is spaced apart from the inner circle 26a of the wiper blade 32a at a distance that is greater than the distance of the nozzle element 12a to the connection adaptor unit 38a. The distance between the nozzle element 12a and the connection adaptor unit 38a is thereby approximately half as large as the distance between the nozzle element 12a and the inner circle 26a of the wiper blade 32a. In principle, it is however also conceivable that the distance between the nozzle element 12a and the connection adaptor unit 38a and the distance between said nozzle element 12a and the inner circle 26a of the wiper blade 32a are approximately equal, or that the distances have a different relationship to one another which appears useful to the person skilled in the art.

The nozzle element 12a is directly connected in a low position to the wiper arm 10a. The nozzle element 12a is fixedly connected to the wiper arm 10a. Said nozzle element 12a is fixedly mounted to said wiper arm 10a by means of an adhesive bond. In principle, it is however also conceivable that the nozzle element 12a is connected to the wiper arm 10a by means of another fastening method, for example by means of a latching connection resulting in a positive-locking fit. In principle, it is, of course, also conceivable that the nozzle element 12a is fastened to the wiper arm 10a by another fastening method that appears useful to the person skilled in the art.

The nozzle element thus protrudes at least 10 mm below a lower edge 46a of the wiper arm 10a. In principle, it is however also conceivable that the nozzle element 12a protrudes further or less below the lower edge 46a of the wiper arm 10a. In this connection, a measurement is taken from a side of the nozzle element 12a which faces the vehicle window pane in the fitted state up to the lower edge 46a of the wiper arm 10a which faces the vehicle window pane in the fitted state. The nozzle element 12a is thereby situated in relationship to the vehicle window pane at an equal height to the wiper lip 16a of the wiper blade 32a. In so doing, the nozzle element 12a is situated on a side of the wiper arm 10a which faces the driver and faces away from the engine hood. As a result, the nozzle element 12a lies in particular in the slipstream of the wiper arm 10a and the wiper blade 32a when the vehicle is moving.

The nozzle element 12a is thereby designed as a separate component. As a result, the nozzle element 12a is produced as an injection molded part in a separate injection molding process. It is therefore also conceivable that the nozzle element 12a is produced as a separate component by means of another process, which appears useful to a person skilled in the art. It is also then further conceivable that a heating element, which is not depicted in detail, is integrated into the nozzle element 12a, whereby a freezing of the nozzle element 12a at cold temperatures can be prevented. In so doing, the heating element can be directly integrated into the nozzle element 12a, for example in an injection molding process, or also separately installed in said nozzle element 12a, for example by means of a form fit. In principle, the invention can also dispense with a heating element.

The nozzle element 12a is provided to spray the wiper fluid at least substantially in the direction of the wiper lip 16a. To this end, the nozzle element 12a has four spray channels 18a, 20a, 22a, 24a. The spray channels 18a, 20a, 22a, 24a are connected directly to the hose connection 44a. Said spray channels 18a, 20a, 22a, 24a lead from an interior of the nozzle element 12a to the outside. An end of the spray channels is in each case configured as an opening, through which the wiper fluid can escape from the nozzle element 12a. As a result, the wiper fluid, which is pumped through the hose connection 44a into the interior of the pump element 12a, can again escape via said spray channels 18a, 20a, 22a, 24a out of the interior of the nozzle element 12a. In so doing, said spray channels 18a, 20a, 22a, 24a can have a conical shape or another shape which appears useful to the person skilled in the art and is oriented outwards, whereby the wiper fluid escaping from said spray channels 18a, 20a, 22a, 24a can be focused and accelerated. In this connection, the ends of said spray channels 18a, 20a, 22a, 24a are in each case oriented at least substantially in the direction of the wiper lip. As a result, the wiper fluid is preferably sprayed on the wiper lip 16a, whereby the wiper fluid wets the entire window pane that the wiper lip 16a passes over. In principle, it is also conceivable that the wiper fluid is sprayed onto the vehicle window pane just in front of the wiper lip 16a. Both spraying results do not disturb the vehicle's driver.

The end of the first spray channel 18a is oriented in the direction of the outer circles 30a. As a result, the spray channel 18a is aligned almost parallel to the main extension direction of the wiper arm 10a. The first spray channel 18a has a slight inclination in the direction of the vehicle window pane. The inclination thereby amounts to approximately 10 degrees. The end of the second spray channel 20a is likewise oriented in the direction of the outer circle 30a. An inclination of the second spray channel 20a from the main extension direction of the wiper arm 10a in the direction of the vehicle window pane amounts to approximately 30 degrees. The third spray channel 22a is approximately aligned orthogonally with respect to the main extension direction of the wiper arm 10a. An inclination of the third spray channel 22a from the main extension direction of the wiper arm 10a in the direction of the vehicle window pane is thereby approximately 90 degrees. The end of the fourth spray channel 24a is oriented in the direction of the inner circle 26a of the wiper blade 32a. An inclination of the fourth spray channel 24a from the main extension direction of the wiper arm 10a in the direction of the vehicle window pane is thereby approximately 30 degrees. The degree specifications of the inclinations of the four spray channels 18a, 20a, 22a, 24a are only approximate figures. A deviation from the specified degree values can amount in each case to plus or minus 15 degrees. In principle, it is also conceivable that the nozzle element 12a has only 3 or also only 2 spray channels 18a, 20a, 22a, 24a. This depends on a desired amount of wiper fluid and on a distribution of the wiper fluid which is to be produced by the wiper device.

Figure 2:
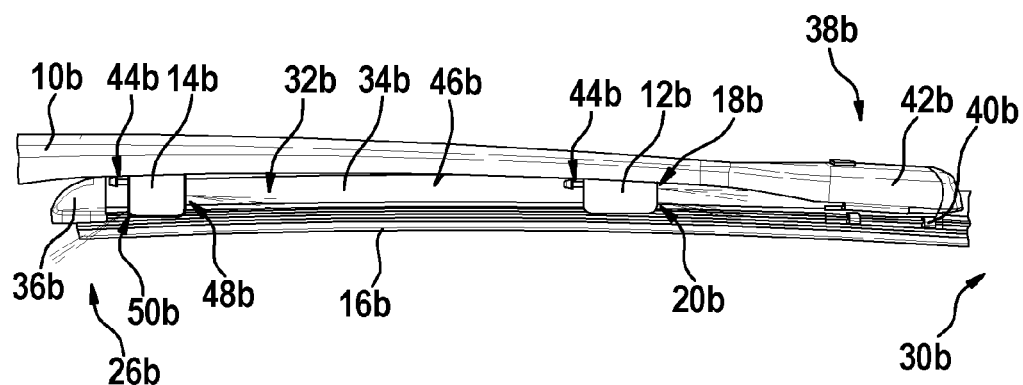
FIG. 2 shows an inventive wiper device comprising two nozzle elements in a second exemplary embodiment.
Figure 3:
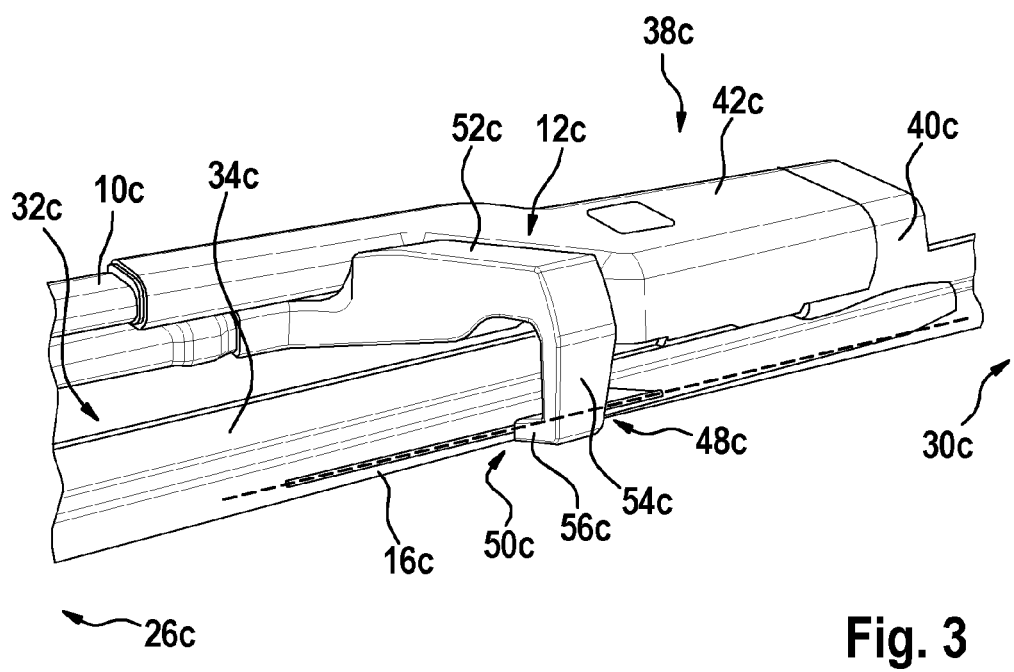
FIG. 3 shows an inventive wiper device comprising a nozzle element on a wiper arm adaptor in a third exemplary embodiment.

Two further exemplary embodiments of the invention are depicted in FIGS. 2 and 3. The following descriptions and the drawings concentrate substantially on the differences between the exemplary embodiments, wherein, with regard to similarly denoted components, in particular with regard to components having the same reference numerals, reference can in principle be made to the drawings and/or the description of the other exemplary embodiments, in particular to FIG. 1. In order to differentiate the exemplary embodiments, the lower case letter a is placed after the reference numerals of the exemplary embodiment in FIG. 1. In the exemplary embodiments of FIGS. 2 and 3, the letter a is replaced by the letters b and c.

FIG. 2 depicts a second exemplary embodiment of the wiper device according to the invention. The wiper device comprises a wiper arm 10b, which can be driven in a pivoting motion by means of a wiper motor that is not depicted in detail. The wiper device comprises a wiper blade 32b, which, in a fitted state, is provided to wipe a vehicle window pane, which is not depicted in detail. The wiper blade 32a is constructed from a plurality of components. The wiper blade 32b comprises a wiper lip 16b, which, in the fitted state, rests against the vehicle window pane, and a spring rail, which is not depicted in detail and is fixedly connected to the wiper lip 16b and presses the same across the entire length thereof against the vehicle window pane. In so doing, said spring rail transmits a wiping force to the wiper lip 16b. The wiper blade 32b thereby does not include an inner circle guidance unit. The wiper blade 32b does not have an inner circle guidance unit on the inner circle thereof, which fixes the wiper blade 32b on the inner circle 26b thereof below the wiper arm 10b.

In order to connect the wiper blade 32b to the wiper arm 10b, the wiper device has a connection adaptor unit 38b. The connection adaptor unit 38b has a wiper blade adaptor 40b and a wiper arm adaptor 42b. The wiper blade adaptor 40b is fixedly connected to the wiper blade 32b. The wiper arm adaptor 42b is fixedly connected to the wiper arm 10b. As a result, the wiper blade 32b can be fixedly connected by means of the wiper blade adaptor 40b and the wiper arm adaptor 42b to the wiper arm 10b.

The wiper device further comprises a first nozzle element 12b and a second nozzle element 14b which are provided to spray wiper fluid. To this end, the nozzle elements 12b, 14b have respectively at least one hose connection 44b to which respectively one wiper fluid hose can be connected, which carries wiper fluid in an operating state and is not depicted in detail. The nozzle elements 14b, 14b are embodied respectively as separate components.

The first nozzle element 12 b is disposed between the inner circle 26b of the wiper blade 32bf and the connection adaptor unit 38b. In so doing, the nozzle element 12b tends to be disposed in the direction of the connection adaptor unit 38b. The nozzle element 12b is spaced apart further from the inner circle 26b of the wiper blade 32b than said nozzle element 12b is from the connection adaptor unit 38b. As a result, the distance between the nozzle element 12b and the connection adaptor unit 38b is approximately half as large as the distance between the nozzle element 12b and the inner circle 26b of the wiper blade 32b. The first nozzle element 12b is thereby directly connected in a low position to the wiper arm 10b.

The first nozzle element 12b is provided to spray wiper fluid at least substantially in the direction of the wiper lip 16b. To this end, the spray nozzle 12b has two spray channels 18b, 20b. The spray channels 18b, 20b are directly connected to the hose connection 44b of the nozzle element 12b. The spray channels 18b, 20b lead outwards from an interior of the nozzle element 12b. As a result, the wiper fluid which is pumped through the hose connection 44b into the interior of the first nozzle element 12b can escape again from the interior of the nozzle element 12b via the spray channels 18b, 20b. In this connection, the spray channels 18b, 20b are substantially aligned in the direction of the wiper lip 16b. An end of the first spray channel 18b of the first nozzle element 12b is oriented in the direction of an outer circle 30b of the wiper blade 32b. The first spray channel 18b is thereby provided to spray wiper fluid as far as possible to the outer circle 30b of the wiper blade 32b. To this end, the first spray channel 18b has only a slight inclination of approximately 15 degrees to the main extension direction of the wiper arm 10b. The second spray channel 20b is likewise oriented in the direction of the outer circle 30b. An inclination of the second spray channel 20b from the main extension direction of the wiper arm 10b in the direction of the motor vehicle window pane is greater than the inclination of the first spray channel 18b and amounts approximately to 30 degrees.

The second nozzle element 14b is likewise disposed between the inner circle 26b of the wiper blade 32b and the connection adaptor unit 38b. The second nozzle element 14b tends to be disposed in the direction of the inner circle 26b. The second nozzle element 14b is thereby spaced apart from the inner circle 26b at a distance which is substantially less than the distance of said nozzle element 14b to the connection adaptor unit 38b. The distance between the nozzle element 14b and the connection adaptor unit 38b is approximately 8 times as large as the distance of the nozzle element 14b to the inner circle 26b of the wiper blade 32b. As a result, the second nozzle element 14b is likewise directly connected in a low position to the wiper arm 10b.

The second nozzle element 14b is likewise provided to spray wiper fluid substantially in the direction of the wiper lip 16b. To this end, the nozzle element 14b has two spray channels 48b, 50b. The spray channels 48b, 50b are directly connected to the hose connection 44b of the nozzle element 14b. The spray channels 48b, 50b lead outwards from an interior of the nozzle element 14b. As a result, the wiper fluid which is pumped through the hose connection 44b into the interior of the second nozzle element 14b can escape again from the interior of the nozzle element 14b via the spray channels 48b, 50b. The spray channels 48b, 50b are thereby substantially aligned in the direction of the wiper lip 16b. An end of the first spray channel 48b is thereby oriented in the direction of the outer circle 30b. In so doing, the spray channel 48b has an inclination with respect to the main extension direction of the wiper arm 10b which is large enough for the wiper fluid sprayed from the first spray channel 48b to reach the first nozzle element 12b. An end of the second spray channel 50b is oriented in the direction of the inner circle 26b in order to be able to spray the wiper fluid to the inner circle 26b of the wiper blade 32b.

FIG. 3 depicts a third exemplary embodiment of the wiper device according to the invention. The wiper device comprises a wiper arm 10c which can be driven in a pivoting motion by means of a wiper motor which is not depicted in detail. The wiper device comprises a wiper blade 32c which, in a fitted state, is provided to wipe a vehicle window pane which is not depicted in detail. The wiper blade 32c is composed of a plurality of components. The wiper blade 32c comprises a wiper lip 16c, which, in the fitted state, rests against the vehicle window pane, and a spring rail, which is not depicted in detail and is fixedly connected to the wiper lip 16c and presses the same across the entire length thereof against the vehicle window pane. In so doing, a wiping force is transmitted to the wiper lip 16c. The wiper blade 32c thereby does not include an inner circle guidance unit. The wiper blade 32c does not have an inner circle guidance unit on the inner circle 26c thereof which fixes the wiper blade 32c to the inner circle 26b thereof below the wiper arm 10c.

In order to connect the wiper blade 32c to the wiper arm 10c, the wiper device comprises a connection adaptor unit 38c. The connection adaptor unit 38c comprises a wiper blade adaptor 40c and a wiper arm adaptor 42c. The wiper blade adaptor 40c is fixedly connected to the wiper blade 32c. The wiper arm adaptor 42c is fixedly connected to the wiper arm 10c. As a result, the wiper blade 32c can be fixedly connected by means of the wiper blade adaptor 40c and the wiper arm adaptor 42c to the wiper arm 10c.

The wiper device further comprises a nozzle element 12c which is provided to spray wiper fluid. To this end, the nozzle element 12c has at least one hose connection 44c to which a wiper fluid hose, which carries wiper fluid in an operating state and is not depicted in detail, can be connected. The nozzle element 14c is embodied as a separate component. The wiper device thereby comprises exclusively the one nozzle element 12c.

The exclusively one nozzle element 12c is disposed on the wiper arm adaptor 42c of the connection adaptor unit 38c. The nozzle element 12c is embodied as a plastic injection molded part and has a U-shaped basic form. An upper region 52c of the nozzle element 12c runs parallel to an upper edge of the wiper arm adaptor 42c that faces away from the wiper blade 32c. A central region 54c of the nozzle element 12c is approximately at a 90 degree angle to the upper region 52c of the nozzle element 12c and extends, in the fitted state, in the direction of the vehicle window pane and the wiper blade 32c. The nozzle element 12c has a lower region 56c at the height of the wiper lip 16c, said lower region being aligned at a 90 degree angle with respect to the central region 54c of said nozzle element 12c. The lower region 56c of said nozzle element 12c is very short in comparison to the central region 54c and the upper region 52c.

The exclusively one nozzle element 12c has two spray channels 48c, 50c which are disposed at a height of the wiper lip 16c. To this end, the spray channels 48c, 50c are integrated into the lower region 56c of the nozzle element 12c. The spray channels 48c, 50c are integrated into a side of the lower region 56c of the nozzle element 12c that faces the wiper lip 16c, whereby the wiper fluid escaping from the ends of the spray channels 48c, 50c can travel directly to the wiper lip 16c. The end of the first spray channel 48c is thereby oriented in the direction of the inner circle 26c of the wiper blade 32c, whereby a region between the connection adaptor unit 38c and the inner circle 26c of the wiper blade 32c can be supplied with wiper fluid by the first spray channel 48c. The end of the second spray channel 50c is oriented in the direction of the outer circle 30c of the wiper blade 32c, whereby a region between the connection adaptor unit 38c and the outer circle 30c of the wiper blade 32c can be supplied with wiper fluid by the second spray channel 50c. In principle, it is also thereby conceivable that further spray channels are integrated into the exclusively one nozzle element 12c. In so doing, it is possible that the further spray channels are oriented in the direction of the inner circle 26c as well as in the direction of the outer circle 30c of the wiper blade 32c. By directly spraying the wiper fluid onto the wiper lip 16c, said wiper fluid can be very well distributed over the entire wiper lip 16c.

The invention claimed is:

1. A wiper device comprising:
   a wiper arm (10c) defining a wiper arm axis;
   a wiper blade (32c) coupled with the wiper arm and having a wiper lip (16c), which in a fitted state of the wiper device, rests against a vehicle window pane; and
   a U-shaped nozzle element (12c) coupled to the wiper arm (10c), the nozzle element (12c) having at least one hose connection (44c) for attaching to a wiper fluid tube, the nozzle element (12c) being provided to spray a fluid from an interior of the nozzle element (12c), the nozzle element (12c) having
      an elongated upper region (52c) arranged above said wiper blade extending transverse to the wiper arm axis and connected to the at least one hose connection (44c),
      an elongated central region (54c) extending downwardly from, transverse to the upper region (52c) and the wiper arm axis from above said wiper blade to beside said wiper blade,
      an elongated lower region (56c) defining a longitudinal axis arranged generally parallel the upper region (52c) and intersecting the wiper blade, the lower region (56c) defining at least one spray channel (48c, 50c),
   the at least one spray channel being connected directly to the at least one hose connection, extending through the upper region, the central region and the lower region and leading from the interior of the nozzle element.

2. The wiper device according to claim 1, characterized in that the nozzle element (12c) is embodied as a separate component from the wiper arm (10c).

3. The wiper device according to claim 1, characterized in that the nozzle element (12c) is provided to spray a wiper fluid at least substantially in a direction of the wiper lip (16c).

4. The wiper device according to claim 3, characterized in that the nozzle element (12c) has at least one first spray channel (48c, 50c) having an end of which is oriented substantially in the direction of the wiper lip (16c).

5. The wiper device according to claim 4, characterized in that the nozzle element (12c) has at least one second spray channel (48c, 50c), an end of which is oriented in another direction than the end of the at least one first spray channel (50c).

6. The wiper device according to claim 1, characterized in that the nozzle element (12c) is disposed between an inner circle (26a; 26b) of the wiper blade (10c) and a connection adaptor unit (38c), in closer proximity to the connection adaptor unit (38c).

7. The wiper device of claim 1, wherein the nozzle element (12c) is a plastic injection molded part.

8. The wiper device of claim 1, further comprising a connection adaptor unit (38c) which fixedly connects the wiper blade (32c) to the wiper arm (10c).

9. The wiper device of claim 8, wherein the connection adaptor unit (38c) includes a wiper blade adaptor (40c) and a wiper arm adaptor (42c), and wherein the wiper blade adaptor (40c) is fixedly connected to the wiper blade (32c) and the wiper arm adaptor (42c) is fixedly connected to the wiper arm (10c).

10. The wiper device of claim 9, wherein the upper region (52c) runs parallel to an upper edge of the wiper arm adaptor (42c) that faces away from the wiper blade (32c).

11. The wiper device of claim 10, wherein the central region (54c) is arranged at an approximately 90 degree angle relative to the upper region (52c).

12. The wiper device of claim 11, wherein the lower region (56c) is arranged at an approximately 90 degree angle with respect to the central region (54c).

13. The wiper device of claim 10, wherein the central region (54c) extends, in the fitted state, in a direction toward the vehicle window pane and generally parallel to the wiper blade (32c).

14. The wiper device of claim 1, wherein the nozzle element (12c) has two spray channels (48c, 50c), which are disposed at a height of the wiper lip (16c) from the window pane.

15. The wiper device of claim 14, wherein a first spray channel (48c) is oriented in a direction of an inner circle (26c) of the wiper blade (32c).

16. The wiper device of claim 15, wherein a second spray channel (48c) is oriented in a direction of an outer circle (30c) of the wiper blade (32c).

* * * * *